United States Patent
O'Brien et al.

(10) Patent No.: US 10,147,455 B1
(45) Date of Patent: Dec. 4, 2018

(54) SENSOR CIRCUIT SUPPORTING MULTIPLE TRANSDUCERS WITH DEDICATED AND SHARED TERMINALS

(71) Applicant: AVAGO TECHNOLOGIES INTERNATIONAL SALES PTE. LIMITE, Singapore (SG)

(72) Inventors: Scott M. O'Brien, Eden Prairie, MN (US); Michael Straub, Longmont, CO (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 15/798,844

(22) Filed: Oct. 31, 2017

(51) Int. Cl.
*G11B 5/09* (2006.01)
*G11B 5/54* (2006.01)
*G11B 20/10* (2006.01)
*G11B 5/55* (2006.01)

(52) U.S. Cl.
CPC ...... *G11B 20/10027* (2013.01); *G11B 5/5526* (2013.01)

(58) Field of Classification Search
CPC ..... G11B 20/10009; G11B 5/09; G11B 5/012; G11B 5/02; G11B 5/782; G11B 27/36; G11B 2220/90; G11B 5/588; G11B 5/59627; G11B 20/10388; G11B 5/596
USPC ........................ 360/25, 39, 70, 46, 67, 77.06
See application file for complete search history.

(56) References Cited

U.S. PATENT DOCUMENTS

| | | | |
|---|---|---|---|
| 6,452,735 B1 * | 9/2002 | Egan ...................... | G11B 21/21 360/25 |
| 7,177,107 B2 * | 2/2007 | Contreras .............. | G11B 5/012 360/46 |

* cited by examiner

*Primary Examiner* — Nabil Hindi
(74) *Attorney, Agent, or Firm* — Sheridan Ross P.C.

(57) ABSTRACT

A memory system, sensor circuit, and method of operating a memory system are provided. The disclosed memory system includes a first transducer configured to output a first electrical signal indicative of a first operating parameter of the memory system. The memory system is further disclosed to include a second transducer configured to output a second electrical signal indicative of a second operating parameter of the memory system where the second transducer shares a node with the first transducer. The memory system is further disclosed to include a sense amplifier that receives the first electrical signal and the second electrical signal and provide an output responsive to both the first electrical signal and the second electrical signal to a preamplifier Integrated Circuit (IC).

20 Claims, 8 Drawing Sheets

SENSOR CIRCUIT SUPPORTING MULTIPLE TRANSDUCERS WITH DEDICATED AND SHARED TERMINALS

FIELD OF THE DISCLOSURE

The present disclosure is generally directed toward methods and circuits for use in memory systems or other systems having multiple transducers.

BACKGROUND

High capacity hard disk drives (HDDs) and other magnetic storage devices employ thermally stable fine-grained high coercivity media. The high coercivity media requires write fields in excess of those attainable with current write heads, the performance of which are limited by pole tip saturation and material properties. Energy-assisted magnetic recording techniques overcome the coercivity/write-field conflict. In heat-assisted recording (HAMR), the temperature of the medium in the write zone is elevated to near the Curie point, typically by a laser, easing magnetization by an achievable write field. An alternative method is microwave-assisted magnetic recording (MAMR), in which near-field microwave radiation excites the recording medium at its ferromagnetic resonance frequency, permitting magnetic moment polarity-switching with reduced write fields.

As with most high precision optical systems, the output power of the element assisting the writing process (e.g., the laser) should be well controlled. To this end, a power monitoring transducer is typically included in the HAMR system at or near the write head. Unfortunately, the introduction of additional transducers may increase the number of terminals required in a preamplifier circuit, which increases the overall footprint/size of the preamplifier circuit. Such an increase in footprint/size is undesirable in many memory systems where miniaturization is desired.

BRIEF DESCRIPTION OF THE DRAWINGS

The present disclosure is described in conjunction with the appended figures, which are not necessarily drawn to scale.

DETAILED DESCRIPTION

Figure 1:
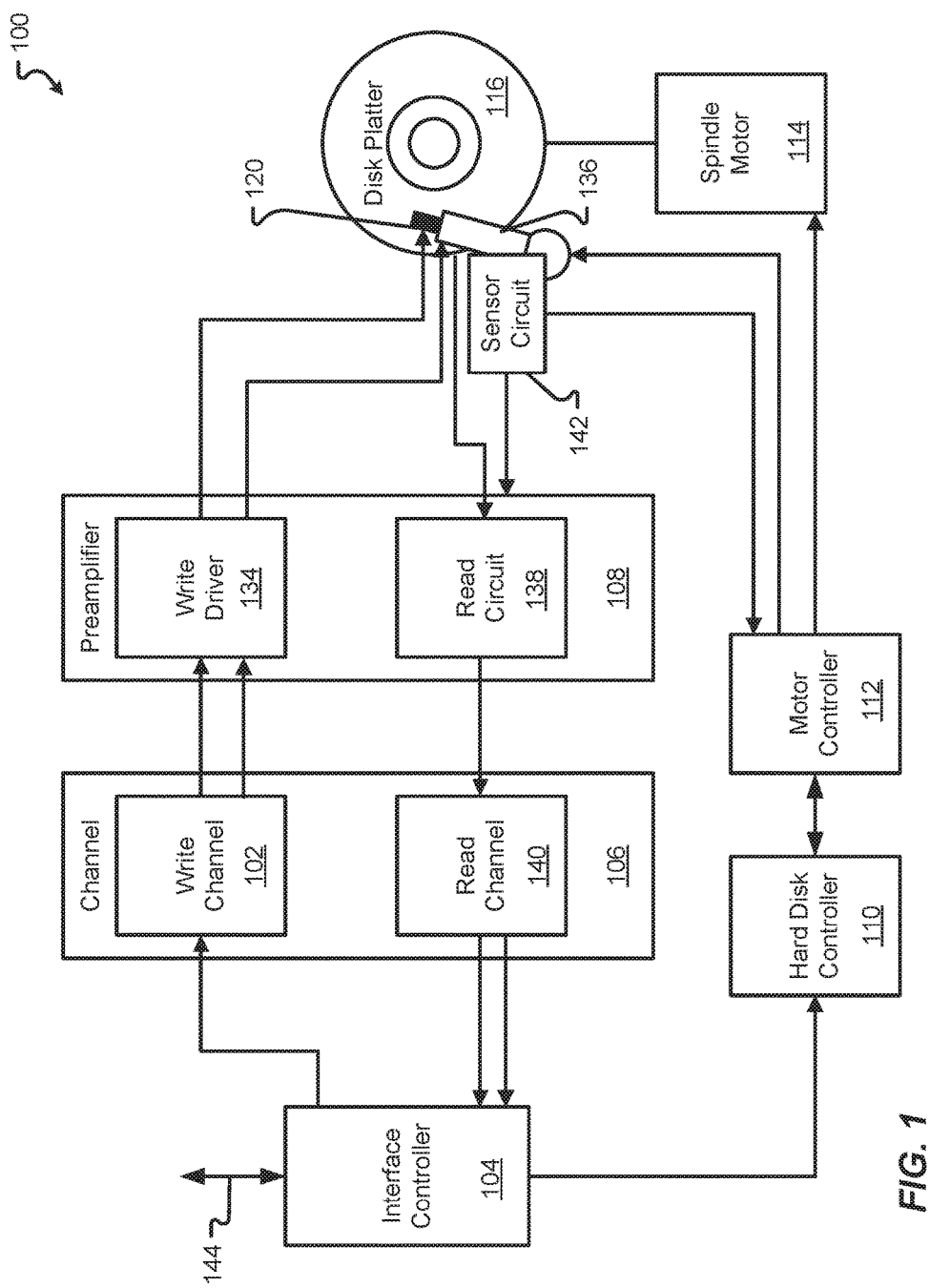
FIG. 1 is a block diagram depicting a memory system in accordance with embodiments of the present disclosure.

Various aspects of the example embodiments will be described herein with reference to drawings that are schematic illustrations of idealized configurations. It should be appreciated that while particular circuit configurations and circuit elements are described herein, example embodiments are not limited to the illustrative circuit configurations and/or circuit elements depicted and described herein. Specifically, it should be appreciated that circuit elements of a particular type or function may be replaced with one or multiple other circuit elements to achieve a similar function without departing from the scope of example embodiments.

It should also be appreciated that example embodiments described herein may be implemented in any number of form factors. Specifically, the entirety of the circuits disclosed herein may be implemented in silicon as a fully-integrated solution (e.g., as a single Integrated Circuit (IC) chip or multiple IC chips) or they may be implemented as discrete components connected to a Printed Circuit Board (PCB).

In an effort to control cost and combat flex routing congestion, some memory systems may require that a power monitoring transducer share one of its terminals with an existing transducer. This effectively creates a need for a preamplifier to support DC bias and high performance sense amplification of a three terminal transducer pair. This is beneficial provided that acceptable electrical performance can be achieved.

For several years the HDD industry has relied upon the Fly Height Sense (FHS) transducer and its associated circuitry within the preamplifier to increase observability of thermal asperities as well as assist in contact detection between the slider and the rotating disk surface which is integral to establishing a well-controlled flying height.

The FHS transducer can be modeled electrically as a resistor with a temperature coefficient. DC bias is applied to the FHS transducer so that a change in temperature will also result in a corresponding electrical signal that can be amplified, filtered, and processed by the preamplifier, read/write channel, and motor controller ICs. Knowing that the local temperature of the sensor will change as it nears the disk surface, proximity detection can be realized.

Some HAMR systems utilize a transducer with similar properties (e.g., a resistor with a temperature coefficient) to monitor laser optical power output. In such a system, the transducer is placed in a location so that it is exposed to a portion of the laser output. The difference is that for this Power Monitoring (PM) transducer it is the laser that causes the temperature change of interest as opposed to the rotating media.

The addition of an FHS-like transducer in the form of a PM transducer to the HAMR system creates an opportunity for pad/flex route sharing. It should be appreciated that while examples provided herein will describe the utilization of a PM transducer and FHS transducer in connection with a memory system, embodiments of the present disclosure are not so limited. For instance, embodiments of the present disclosure can be modified to accommodate more than two transducers (e.g., three transducers sharing terminals—creating a three sensor/four pin configuration, four transducers sharing two or three terminals—creating a four sensor/six pin configuration, etc.). Moreover, embodiments of the present disclosure may utilize other types of transducers, such as any type of transducer that supports the measurement of energy created by a MAMR system at or near the recording media. It should also be appreciated that embodiments of the present disclosure are not limited to use in memory systems. Rather, any system that utilizes two or more transducers where it is desirable to have those transducers share at least one terminal may benefit from the embodiments disclosed herein.

Turning now to FIG. 1, a memory system 100 will be described in accordance with at least some embodiments of the present disclosure. Memory system 100 may be, for example, a hard disk drive system utilizing a disk or a plurality of disks for data storage. Memory system 100 is depicted to include an interface controller 104, channel circuit 106, preamplifier 108, a hard disk controller 110, a motor controller 112, a spindle motor 114, a disk platter 116, and a read/write head assembly 120. Interface controller 104 controls addressing and timing of data to/from disk platter 116. The interface controller 104 may include devices such as a processor, buffer memory, format control, error correction circuits, and interface circuits. The data on disk platter 116 consists of groups of magnetic signals that may be written and detected by read/write head assembly 120 when the assembly is properly positioned over disk platter 116. In one embodiment, disk platter 116 includes magnetic signals recorded in accordance with either a longitudinal or a perpendicular recording scheme.

During a write operation, interface controller 104 receives digital data to be stored on the disk platter 116 and provides corresponding digital write data to the write channel 102 in the channel circuit 106. The digital data may be received in serial form on a standardized device interface such as a Serial Advanced Technology Attachment (SATA) interface 144. During write operations, the digital data received via interface 144 can be stored in a local buffer memory of the interface controller 104, formatted, and augmented then with error correction codes.

Write channel 102 may process the digital write data in a number of ways, such as serializing the data, modulation coding the data and adding parity bits, serializing the data at the desired bit-rate, and performing magnetic write precompensation. The write channel 102 may be configured to provide encoded write data (or a first control signal) and a HAMR trigger pulse signal (or second control signal) to a write driver 134 in preamplifier 108. In some embodiments, the preamplifier 108 is mounted on an actuator arm 136, and the encoded write data and HAMR trigger pulse signal are driven from the channel circuit 106 by transmitters and delivered over a flex-cable in differential positive emitter-coupled logic (PECL) format to an appropriate driver in the arm-mounted preamplifier 108. The preamplifier 108 may be provided in the form of an IC chip, a plurality of IC chips, and/or with one or more components mounted directly to a PCB. Although depicted as being separate from the sensor circuit 142, the preamplifier 108 may include one or more components of a sensor circuit 142 as will be discussed in further detail herein. In other words, one or more components of the sensor circuit 142 may be included in the preamplifier IC 108 without departing from the scope of the present disclosure.

In operation, the preamplifier 108 converts the encoded write data received from the channel 106 to a high-current analog write signal and impresses in the read/write head assembly 120 a bipolar programmable write current of polarity determined by that of the write data signal. Simultaneously, that HAMR trigger pulse signal may cause a laser also connected to the read/write head assembly 120 to heat up the magnetic recording media in cooperation with the application of the write data signal by the read/write head assembly 120.

As will be discussed in further detail herein, the sensor circuit 142 may be provided on the read/write head 136, as part of the preamplifier IC 108, and/or at any other location on or near the recording media. In some embodiments, the sensor circuit 142 may include one or more transducers (e.g., PM transducers, FHS transducers, etc.) that are positioned in proximity to the read/write head 120 and/or recording media provided on the disk platter 116. The transducers included in the sensor circuit 142 may be the only portions of the sensor circuit 142 not included in the preamplifier IC 108 because the transducers need to be capable of detecting operational parameters of the read/write head assembly 120 and, therefore, need to be exposed to the environment about the read/write head assembly 120. The rest of the sensor circuit 142, however, may be incorporated into the preamplifier IC 108 and/or other components of the read/write head assembly 120. As shown in FIG. 1, the sensor circuit 142 may provide information about the read/write head assembly 120 back to the preamplifier IC 108, Read Channel IC 140 and/or the motor controller 112 and that information can be used to further control operations of the actuator arm 136 and/or read/write head assembly 120. In some embodiments, feedback from the sensor circuit 142 may be provided to both the preamplifier IC 108 and the motor controller 112. Alternatively, all feedback information may be provided by the sensor circuit 142 to the preamplifier IC 108, which routes necessary sensor feedback information to the motor controller 112 via the channel 106 and interface controller 104.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). A read circuit 138 in the preamplifier 108 establishes a bias current in the magneto-resistive read/write head assembly 120. Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal representative of the magnetic data on disk platter 116. This minute analog signal is transferred from read/write head assembly 120 to read circuit 138 in the preamplifier 106, where it is amplified and is conveyed to a read channel 140 in the channel circuit 106 as analog read data. In turn, read channel 140 decodes and digitizes the received analog signal to recreate the user data originally written to disk platter 116, as well as extracts servo information.

As part of processing the analog read data, read channel circuit 140 may perform one or more operations such as analog filtering, variable gain amplification, analog to digital conversion, equalization, timing recovery, data detection, decoding, deserialization, and servo demodulation to obtain the user data and servo information. The user data is provided by read channel 140 as digital read data to the interface controller 104, where it is error-corrected, stripped of special formatting fields, and reassembled in buffer memory for transmission to a user device or host device via the interface 144. The read channel 140 also provides the servo data to the interface controller 104 for use in driving the hard disk controller 110 and motor controller 112. During both the read and write operations, microcode in the interface controller 104 controls spindle speed and regulates head position to maintain accurate track-following and to seek between tracks. Servo position information for these functions is demodulated by the read channel 140 from dedicated fields prerecorded on the disk platter 116 at intervals between data records. It should be understood that elements such as a FHS transducer, a PM transducer, a laser, a Spin Torque Oscillator (STO), and the like may be incorporated into the read/write head assembly 120, the sensor circuit 142, and/or other components near the actuator arm 136.

It should be noted that storage system 100 may be integrated into a larger storage system such as, for example, a RAID (redundant array of inexpensive disks or redundant array of independent disks) based storage system.

It should also be noted that various functions or blocks of storage system 100 may be implemented in either software or firmware, while other functions or blocks are implemented in hardware. The various blocks disclosed herein may be implemented in integrated circuits or IC chips along with other functionality. Such integrated circuits or IC chips may include all of the functions of a given block, system or circuit, or only a subset of the block, system or circuit. Further, elements of the blocks, systems or circuits may be implemented across multiple IC chips. Such IC chips may be any type of integrated circuit known in the art including, for instance, a monolithic integrated circuit, a flip chip integrated circuit, a multichip module integrated circuit, and/or a mixed signal integrated circuit.

With reference now to FIGS. 2-7, various circuit configurations will be described in accordance with at least some embodiments of the present disclosure. It should be appreciated that the circuit configurations are provided as examples and are not intended to limit the present disclosure to any particular configuration of circuit elements. Moreover, the components depicted and described herein may be incorporated completely or partially within the sensor circuit 142, completely or partially within a preamplifier IC 108, completely or partially within the read/write head assembly 120, or combinations thereof. As a non-limiting example, transducers may be provided as external circuit components that are mounted on or near the read/write head assembly 120 whereas other circuit components may be included in the preamplifier IC 108.

Figure 2:
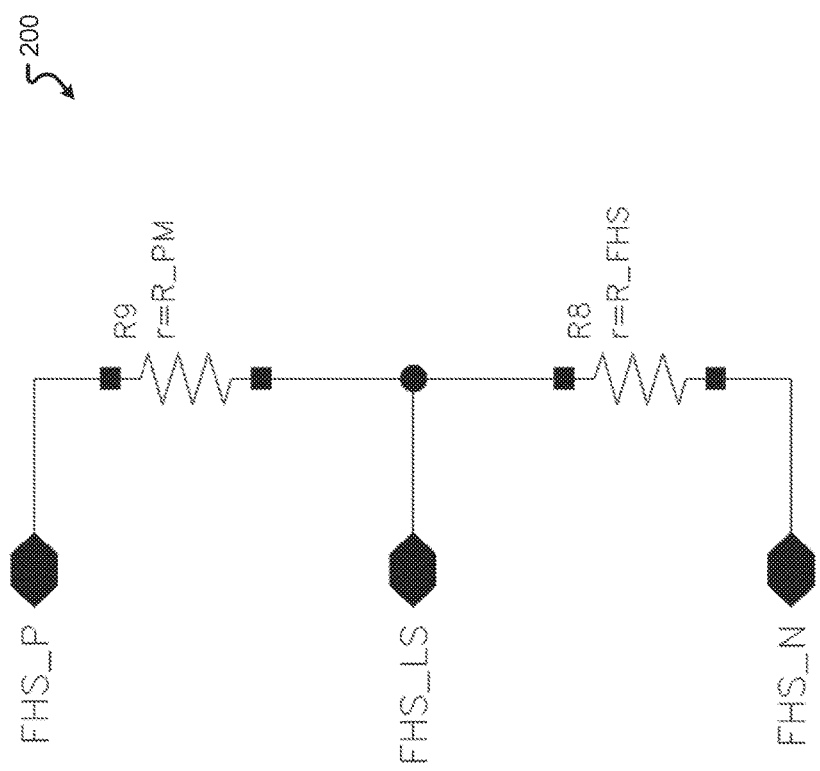
FIG. 2 is circuit diagram depicting a first circuit configuration useable in connection with a sensor circuit in accordance with embodiments of the present disclosure.

Referring initially to FIG. 2, a first circuit 200 that may be useable in connection with the sensor circuit 142 will be described in accordance with at least some embodiments of the present disclosure. The circuit 200 is shown to include a first transducer R_FHS and a second transducer R_PM. The first transducer R_FHS may correspond to a FHS transducer (e.g., an analog device which converts a physical property such as heat or temperature into an electrical resistance to describe a fly-height of the read/write head assembly 120 relative to the recording media). The second transducer R_PM may correspond to a PM transducer (e.g., an analog device which converts a physical property such as heat, temperature, or laser power output into an electrical resistance to describe a power output of a laser).

In the depicted embodiment, the first transducer R_FHS is connected between a first terminal FHS_N and a second terminal FHS_LS. The second transducer R_PM is connected between the second terminal FHS_LS and a third terminal FHS_P. In other words, the transducers R_FHS and R_PM share a common terminal (e.g., the second terminal FHS_LS) in circuit 200. In this non-limiting example, the nodes/terminals FHS_P, FHS_LS, and FHS_N would all be routed from the slider 136 to the preamplifier 108.

Figure 3:
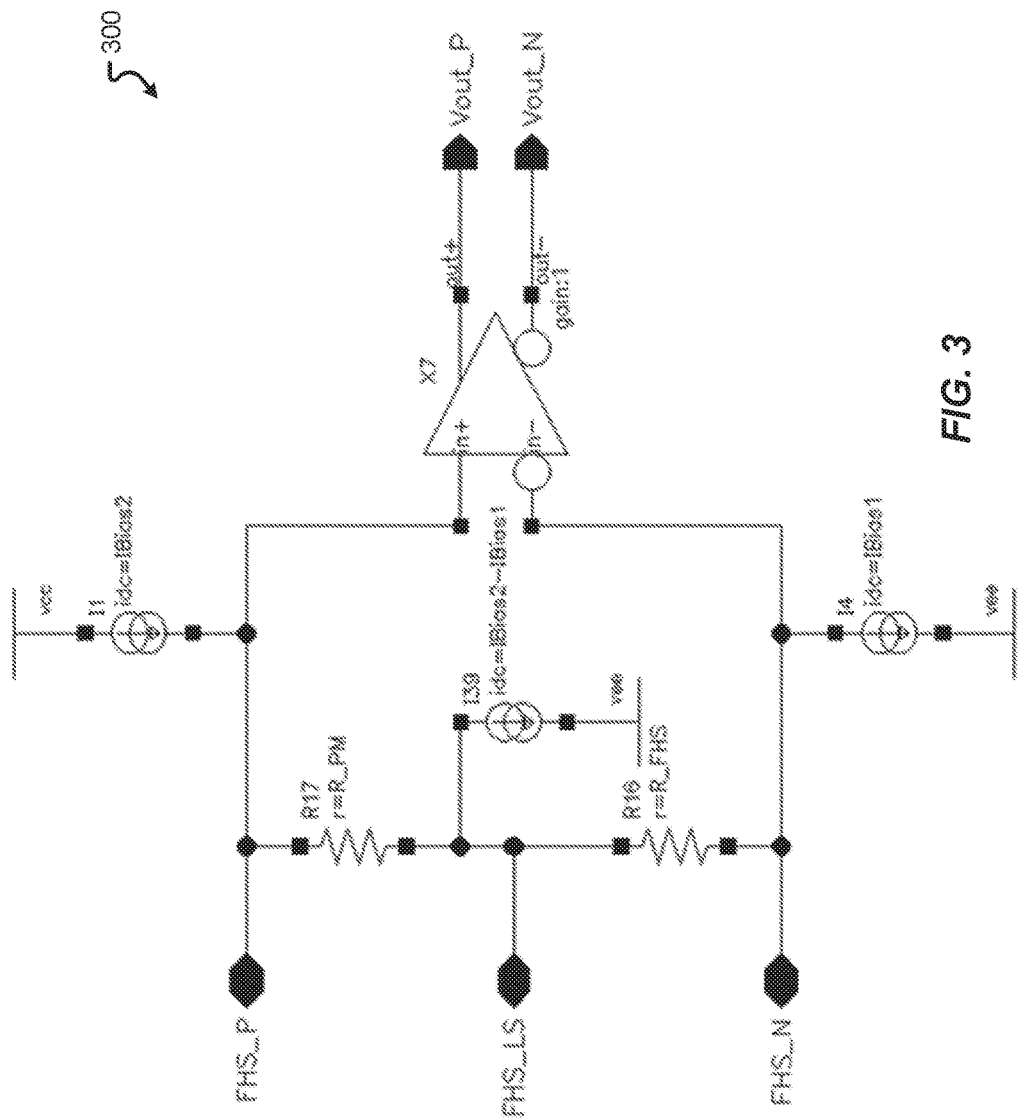
FIG. 3 is a circuit diagram depicting a second circuit configuration useable in connection with a sensor circuit in accordance with embodiments of the present disclosure.

As can be appreciated, for these transducer to create an electrical signal, the transducer should be provided with a sufficient DC bias. In some embodiments, it is possible to perform a multiplexing function between the two transducers by appropriately selecting a DC bias applied to one or both transducers. With reference now to FIG. 3, a circuit 300 that can be used to apply such a DC bias to the transducers R_FHS, R_PM and to multiplex the outputs thereof will be described in accordance with at least some embodiments of the present disclosure. As seen in FIG. 3, the transducers R_FHS, R_PM are connected across three terminal nodes FHS_P, FHS_LS, and FHS_N, meaning that the transducers R_FHS, R_PM share a common node (e.g., FHS_LS). The first transducer R_FHS receives a first DC bias IBias1 whereas the second transducer R_PM receives a second DC bias IBias2. It should be appreciated that the transducers may receive the same or different values of DC bias. This is made possible by current source 139 which is bidirectional (i.e. can either sink or source current). It should also be appreciated that the transducers may receive their DC bias from a common voltage source.

The output of each transducer R_FHS, R_PM is provided to a sense amplifier X0. The sense amplifier X0 is shown to be a differential sense amplifier, but it should be appreciated that any type of amplifier or collection of amplifiers can be used to achieve the multiplexing described herein. In some embodiments the sense amplifier X0 may provide a differential signal output Vout_N, Vout_P. Using this configuration, the differential signal output of the sense amplifier X0 (Vout_P minus Vout_N) would contain information from both transducers.

It should be noted that the polarity of the signal generated by these transducers follows the polarity of its DC bias. Therefore, by controlling the direction of the bias current of one of the transducers either the summation or difference of the two signals can be presented at the output of the sense amplifier X0. Thus, in the configuration of circuit 300, if both transducers R_PM and R_FHS are biased with IBias2=IBias1=+I_Bias, then Vout_P−Vout_N=V_PM+V_FHS. But if transducer R_PM is biased with IBias2=+I_Bias and transducer R_FHS is bias with IBias1=−I_Bias, then Vout_P−Vout_N=V_PM−V_FHS. This capability provides significant value to the end user as signals or conditions common to both sensors (e.g., ambient temperature near the read/write head assembly 120) can be rejected, if desired.

Figure 4:
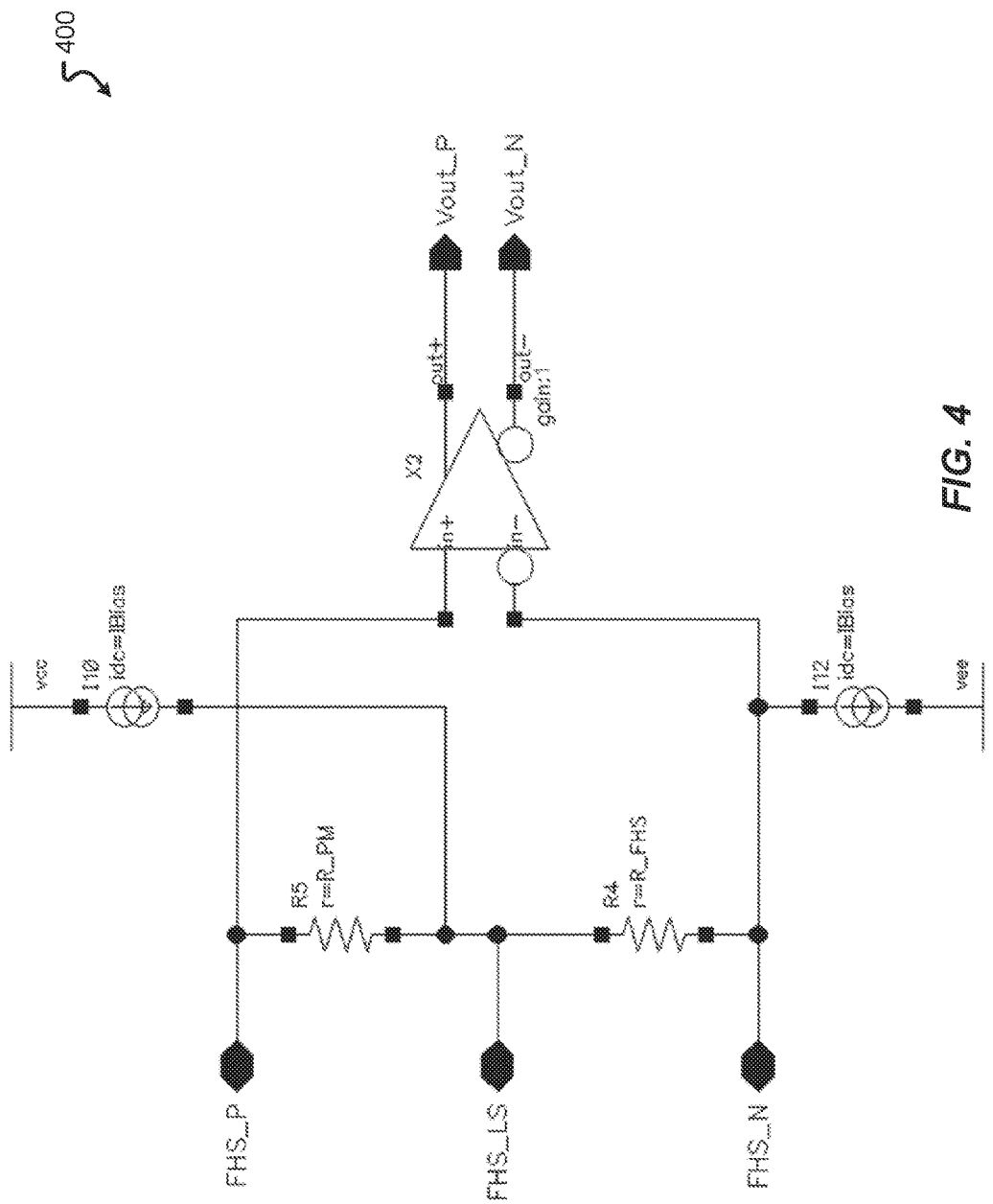
FIG. 4 is a circuit diagram depicting a third circuit configuration useable in connection with a sensor circuit in accordance with embodiments of the present disclosure.
Figure 5:
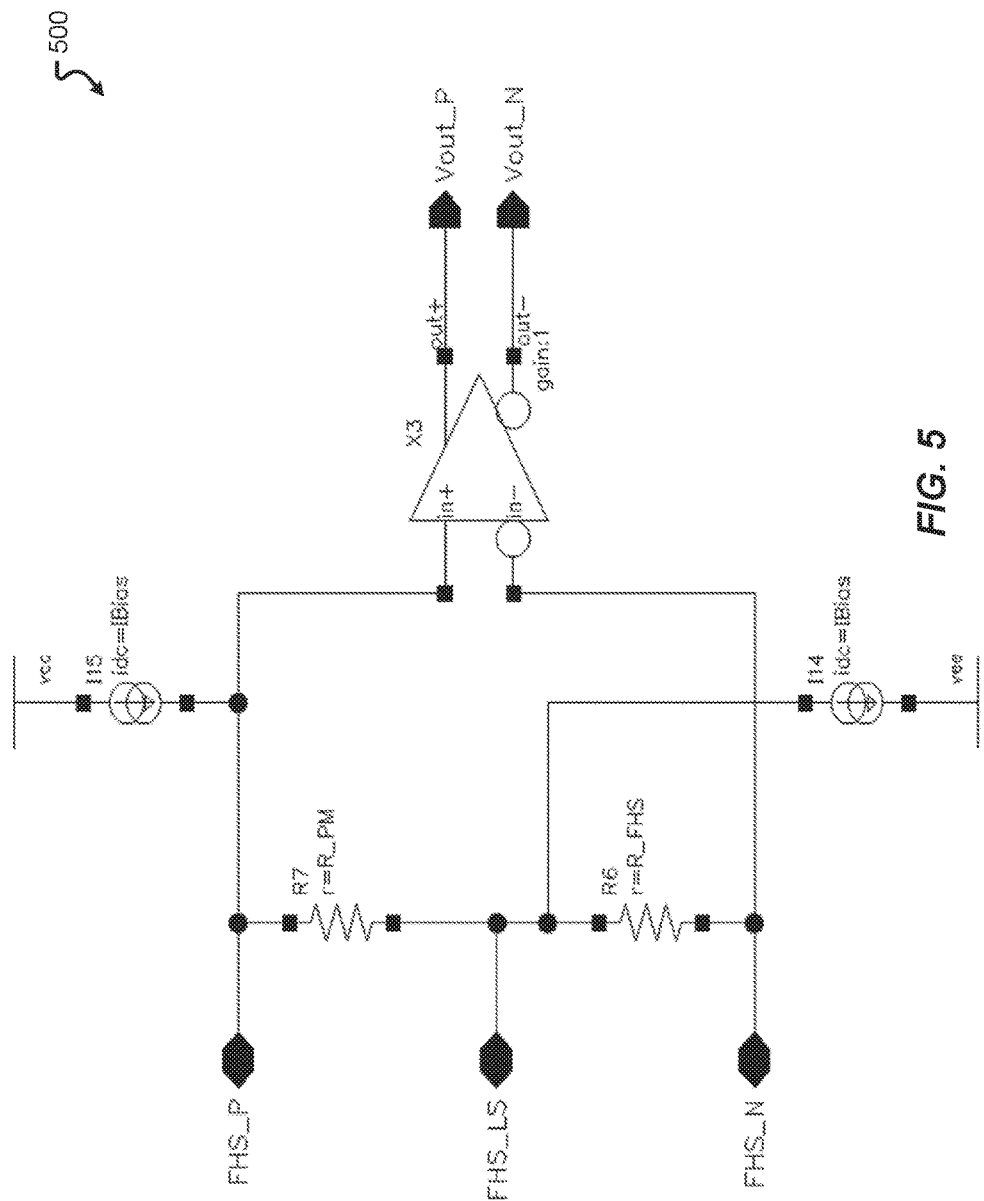
FIG. 5 is a circuit diagram depicting a fourth circuit configuration useable in connection with a sensor circuit in accordance with embodiments of the present disclosure.
Figure 6:
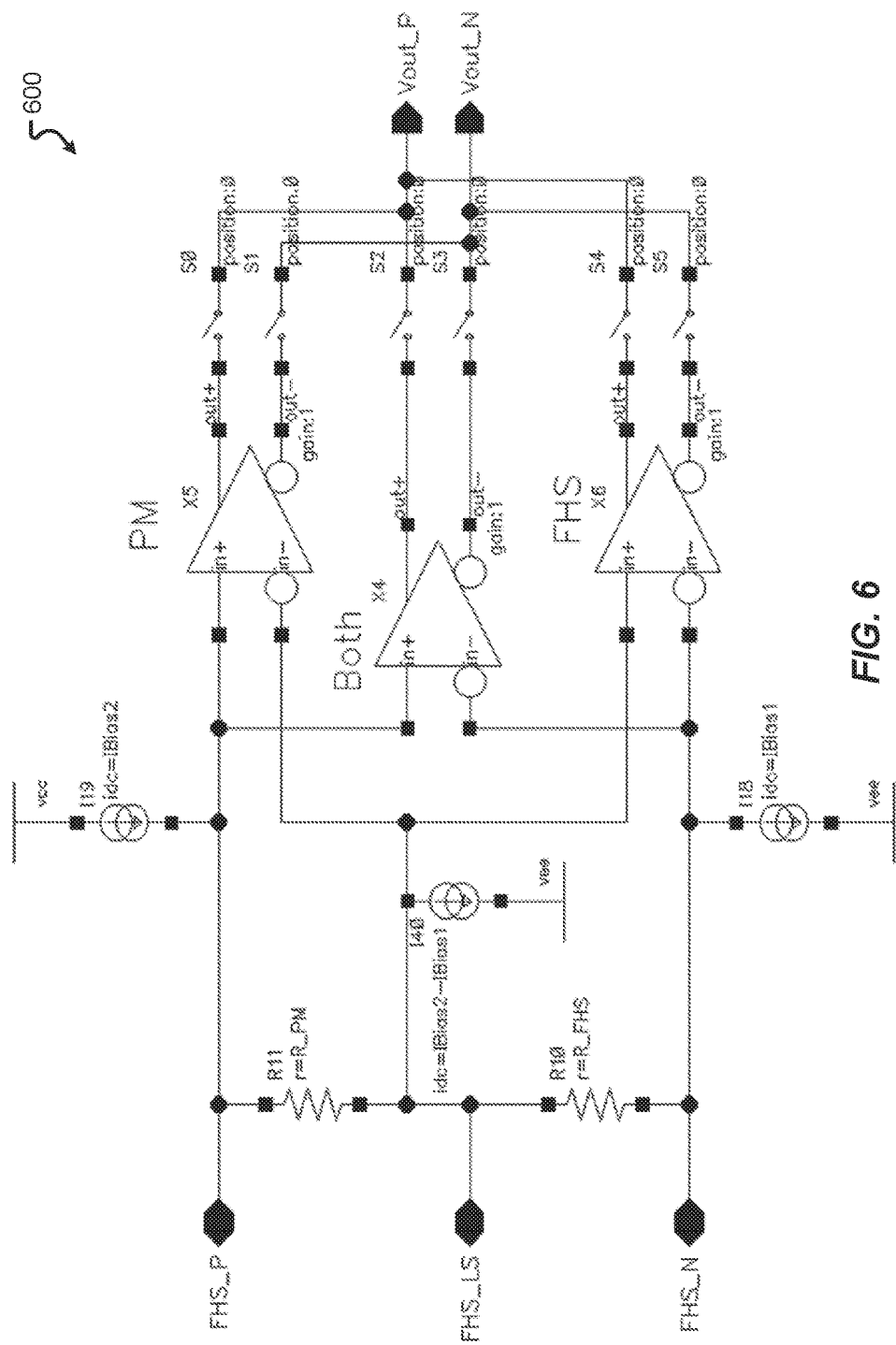
FIG. 6 is a circuit diagram depicting a fifth circuit configuration useable in connection with a sensor circuit in accordance with embodiments of the present disclosure.

FIGS. 4 and 5 depict circuits 400, 500 that are variations of the circuit 300 depicted in FIG. 3. Circuit 400 depicted in FIG. 4 shows the first transducer R_FHS as being the only transducer in the circuit 400 that receives the DC bias current. This is done by connecting the second DC bias I10 to the second/common terminal FHS_LS. With such a connection, only information from the first transducer R_FHS (e.g., fly-height information) would be observed at the output of the sense amplifier X2.

Contrasted with circuit 400, the circuit 500 depicted in FIG. 5 shows the second transducer R_PM as being the only transducer in the circuit 500 that receives the DC bias current. This configuration is achieved by connecting the first DC bias 114 to the second/common terminal FHS_LS. In this configuration, only information from the second transducer R_PM (e.g., last power monitoring information) would be observed at the output of the sense amplifier X3.

It should be noted that for the sake of simplicity the DC bias is represented by open loop current sources delivering a current of value of "IBias" to the transducers. In the actual implementation, either a constant current or constant voltage bias could be applied. Furthermore, the bias could be either open loop or be the output of a feedback control loop. Additionally, when both transducers are biased, a user could choose to apply a different amount of bias to the transducers. For example, IBias could be applied to the first transducer R_FHS and IBias/2 could be applied to the second transducer R_PM. Further still, the common-mode voltage of the resistor stack could be controlled to any arbitrary level between power supplies VCC and VEE provided that device headroom, breakdown and other system level constraints are met. The circuitry to set the head common-mode voltage could either be open loop or be the output of a feedback control loop.

To avoid confusion, it should also be noted that only the two transducers (R_FHS and R_PM) shown in FIGS. 2-5 may external to the preamplifier 108. This is because the transducers are operating as sensors obtain information indicative of operating parameters of the memory system 100 (e.g., temperature and/or power information at or near the read/write head assembly 120 or spindle 136. Everything else shown in circuits 200, 300, 400, or 400 may reside within the preamplifier IC 108 or external therefrom.

In accordance with at least some embodiments of the present disclosure, the multiplexing function of the circuits may be controlled by appropriately steering the DC bias to the desired transducer(s)/sensor(s). This permits one to utilize a single, balanced differential low-noise amplifier for sensing the input signal(s). The memory system 100 environment contains several common-mode noise generators (e.g. clocks, external RF interferers, spindle motor, voice coil motor, etc.). Any sense amplifier can be used which provides suitable rejection of such common-mode noise signals.

In some examples described herein, the multiplexing function is used to enable separation of the FHS information and PM information (e.g., information from the different transducers). An alternative implementation is shown in the circuit 600 of FIG. 6 and will be described in accordance with at least some embodiments of the present disclosure. The circuit 600 utilizes dedicated multiple sense amplifiers X5 and X6 to perform the multiplexing. In particular, a first sense amplifier X6 is shown as being connected to the first and second terminals FHS_N and FHS_LS whereas a second sense amplifier X5 is shown as being connected to the second and third terminals FHS_LS and FHS_P. Circuit 600 also shows a third sense amplifier X4 as being connected to the first and third terminals FHS_N and FHS_P. The outputs of the sense amplifiers X4, X5, X6 are switchably connected to the output of the circuit 600. In this case, the user would choose which sense amplifier(s) drive the circuit output Vout_P-Vout_N. In some embodiments, only a single output of a sense amplifier is selected to be connected to the circuit 600 output. The other two sense amplifiers would be disconnected from the circuit 600 output by having their respective switches placed in an open position. It should be appreciated that the switch position could be switched a single time during an initial configuration of the sensor circuit 142. Alternatively, the switch position(s) can be adjustable during device operation or after the sensor circuit 142 has been installed into a memory system 100.

It should be noted that in circuit 600, common-mode rejection is almost certainly degraded due to the impedance imbalance present on the three terminals. Another disadvantage is the additional power and cost in the form of circuit area required. The benefit, however, is that additional circuit design flexibility is achieved, among other things, by providing the plurality of switches between the independent sense amplifiers X4, X5, X6.

Figure 7:
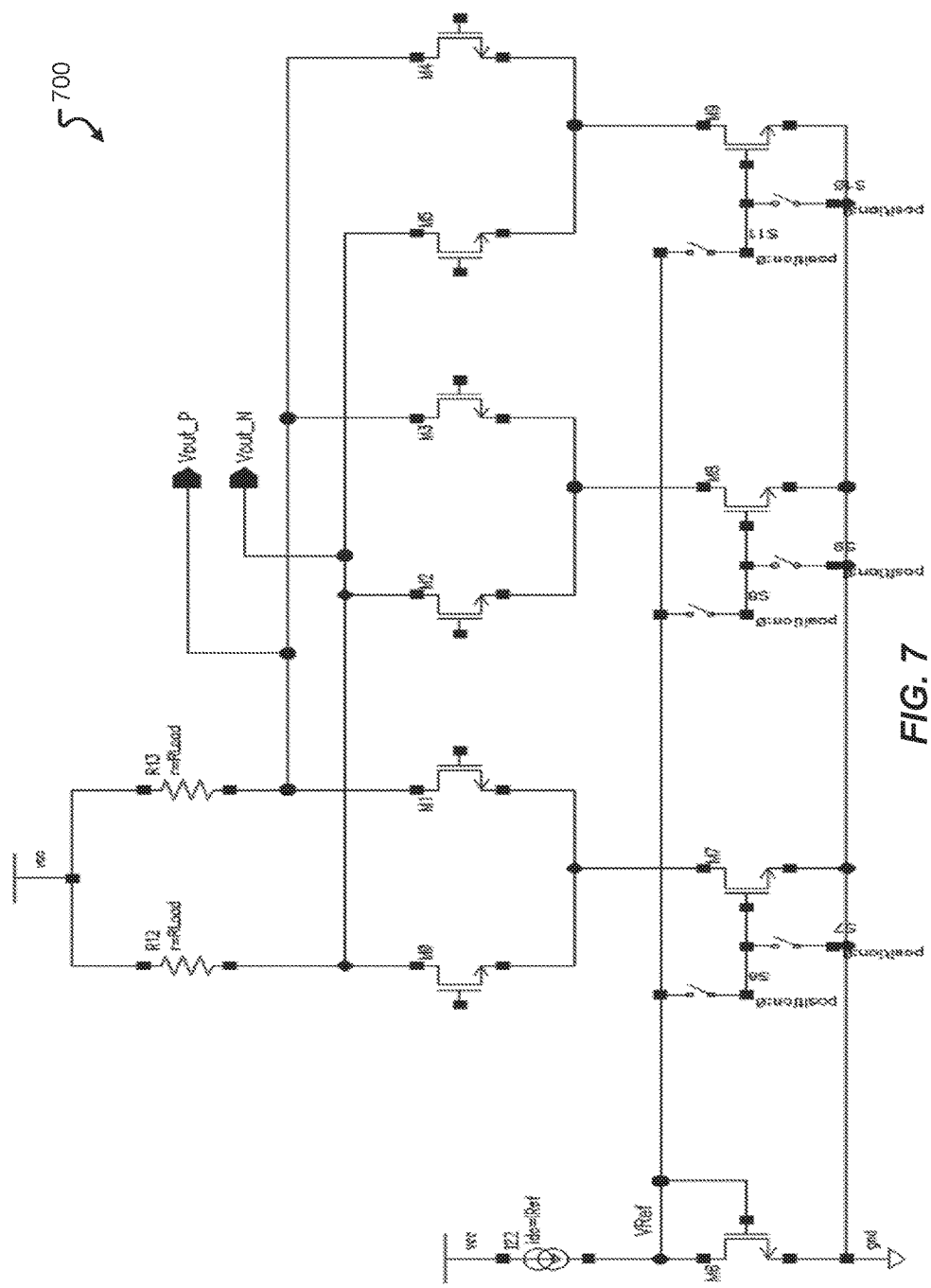
FIG. 7 is a circuit diagram depicting a sixth circuit configuration useable in connection with a sensor circuit in accordance with embodiments of the present disclosure.

The multiplexing in FIG. 5 is depicted as being achieved through behavioral switches S0-S5. This could be implemented with transistors in a pass gate configuration. Alternatively, the sense amplifiers could drive a summing junction as shown in FIG. 7. In this case, multiplexing is performed by appropriately enabling/disabling the bias current for each path by selectively opening or closing the various switches in the circuit 700.

It should be appreciated that the three amplifiers need not be identical in gain and frequency response. If the frequency response of the two transducers is different, signal processing and a single Low Noise Amplifier (LNA) could be used to separate the transducers form the sense amplifiers.

Figure 8:
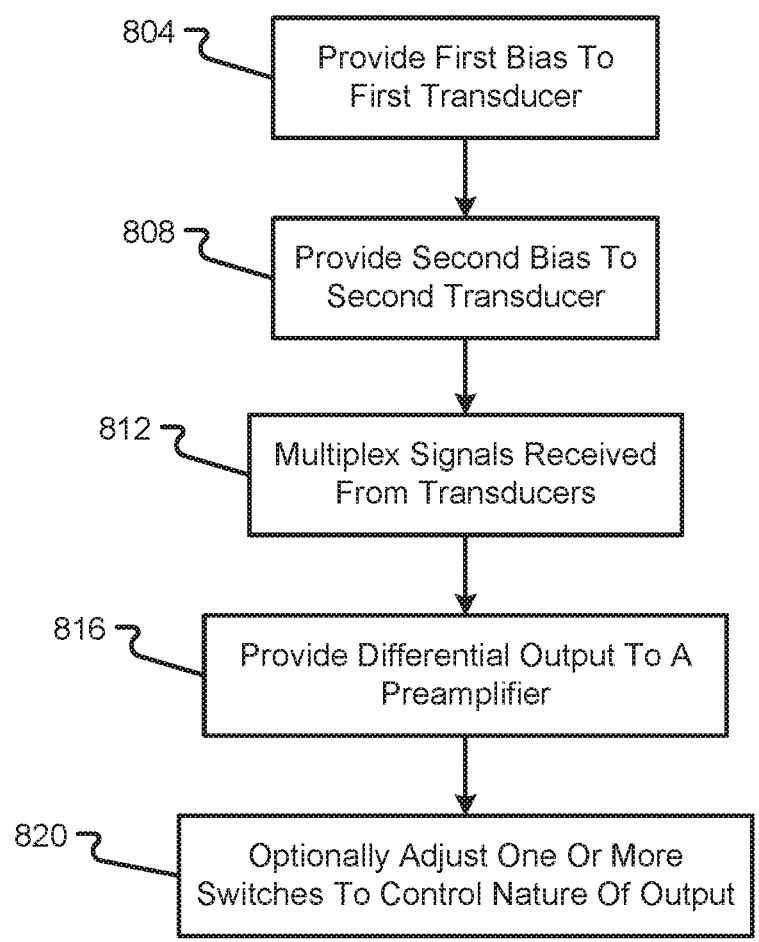
FIG. 8 is a flow diagram depicting a method of operating a memory system in accordance with embodiments of the present disclosure.

With reference now to FIG. 8, a method of operating a memory system will be described in accordance with at least some embodiments of the present disclosure. The method begins by providing a first DC bias to a first transducer of the memory system (step 804). In some embodiments, the first transducer may output a first electrical signal in response to receiving the first bias. This first output may be indicative of a first operating parameter of the memory system. For instance, the first transducer may correspond to a fly-height sensor that converts a local temperature indicative of a distance between a memory media and a read/write head into an electrical signal.

The method continues by providing a second DC bias to a second transducer of the memory system (step 808). The second DC bias may be the same or different as compared to the first DC bias. Additionally, the first DC bias may have a different polarity as compared to the second DC bias or the polarities can be the same in other circumstances.

In some embodiments, the second transducer may output a second electrical signal in response to receiving the second bias. The second output may be indicative of a second operating parameter of the memory system. For instance, the second transducer may correspond to a power monitoring sensor that converts a local temperature indicative of a laser output into an electrical signal. In some embodiments, the first and second transducers may share a circuit node with one another. Thus, although the two transducers each have at least two leads, the circuit used to provide inputs to the two transducers may only need three terminals or nodes as compared to needing four terminals or nodes (e.g., due to the shared nodes).

The method continues by multiplexing the first electrical signal and the second electrical signal to produce a differential output (step 812). This differential output may then be provided to a preamplifier of the memory system (step 816). As noted above, the differential output may also be adjusted by dynamically controlling/adjusting one or more switches that are connected between an output of the amplifier(s) performing the multiplexing and an output of the circuit (step 820).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A memory system, comprising:
   a first transducer configured to output a first electrical signal indicative of a first operating parameter of the memory system, wherein the first transducer has a first DC bias applied thereto;
   a second transducer configured to output a second electrical signal indicative of a laser output, wherein the second transducer has a second DC bias applied thereto, and wherein the second transducer shares a node with the first transducer; and
   a sense amplifier that receives the first electrical signal and the second electrical signal and provides an output responsive to both the first electrical signal and the second electrical signal to a preamplifier Integrated Circuit (IC).

2. The memory system of claim 1, wherein the first transducer comprises a fly height sense transducer that converts a local temperature indicative of a distance between a memory media and a read/write head to the first electrical signal.

3. The memory system of claim 2, wherein the second transducer comprises a power monitoring transducer that converts a local temperature indicative of the laser output to the second electrical signal.

4. The memory system of claim 1, wherein the first DC bias is different from the second DC bias.

5. The memory system of claim 1, wherein the first DC bias is the same as the second DC bias.

6. The memory system of claim 1, wherein the first DC bias comprises a positive DC bias and the second DC bias comprises a negative DC bias that is approximately the same magnitude as the first DC bias.

7. The memory system of claim 1, wherein the sense amplifier multiplexes the first electrical signal and the second electrical signal to generate the output and wherein the output of the sense amplifier comprises a differential signal that contains information for both the first transducer and the second transducer.

8. A sensor circuit for use in connection with a memory system, the sensor circuit comprising:
   a first transducer that receives a first bias and produces a first electrical signal indicative of a first operating parameter of the memory system, wherein the first transducer is connected between a first circuit node and a second circuit node;
   a second transducer that receives a second bias and produces a second electrical signal indicative of a second operating parameter of the memory system, wherein the second transducer is connected between the second circuit node and a third circuit node; and
   a differential Low-Noise Amplifier (LNA) that receives the first electrical signal and the second electrical signal and outputs a differential signal indicative of a difference between the first electrical signal and the second electrical signal, wherein the differential signal output by the differential LNA is provided to a preamplifier of the memory system, wherein a first input of the differential LNA is connected to the first circuit node, and wherein a second input of the differential LNA is connected to the third circuit node.

9. The sensor circuit of claim 8, wherein the first transducer comprises a temperature transducer and wherein the second transducer comprises a temperature transducer.

10. The sensor circuit of claim 8, wherein the first bias comprises a first DC bias and the second bias comprise a second DC bias.

11. The sensor circuit of claim 8, wherein the first bias comprises a first constant voltage bias and the second bias comprises a second constant voltage bias.

12. The sensor circuit of claim 8, wherein the first transducer comprises a fly height sense transducer and wherein the second transducer comprises a power monitoring transducer.

13. The sensor circuit of claim 8, wherein the differential LNA multiplexes the first electrical signal and the second electrical signal.

14. The sensor circuit of claim 8, wherein the first bias comprises a positive voltage or current bias and the second bias comprises a negative voltage or current bias that is approximately the same magnitude as the first bias.

15. The sensor circuit of claim 8, wherein the differential LNA is connected to the first circuit node and the third circuit node, the sensor circuit further comprising:
   a second LNA connected with the first circuit node and the second circuit node; and
   a third LNA connected with the second circuit node and the third circuit node, wherein each of the differential LNA, second LNA, and third LNA are further connected to different switches that selectively enable one of the differential LNA, second LNA, and third LNA to provide their respective output to the preamplifier while selectively disabling the other two of the differential LNA, second LNA, and third LNA from providing their outputs to the preamplifier.

16. A method of operating a memory system, comprising:
   providing a first bias to a first transducer of the memory system, wherein the first transducer outputs a first electrical signal in response to the first bias that is indicative of a first operating parameter of the memory system;
   providing a second bias to a second transducer of the memory system, wherein the second transducer outputs a second electrical signal in response to the second bias that is indicative of a second operating parameter of the memory system, wherein the second bias is approximately the same magnitude as the first bias, and wherein the second transducer shares a circuit node with the first transducer;
   multiplexing the first electrical signal and the second electrical signal to produce a differential output; and
   providing the differential output to a preamplifier of the memory system.

17. The method of claim 16, wherein the first bias comprises at least one of a first constant current bias and a first constant voltage bias.

18. The method of claim 17, wherein the second bias comprises at least one of a second constant current bias and a second constant voltage bias.

19. The method of claim 16, wherein a differential low-noise amplifier is used to multiplex the first electrical signal and the second electrical signal.

20. The method of claim 16, wherein the first transducer is connected to a first differential amplifier and a second differential amplifier, wherein the second transducer is connected to the second differential amplifier and a third differential amplifier, the method further comprising:
   adjusting one or more switches to control whether the differential output provided to the preamplifier corresponds to an output of the first different amplifier, the second differential amplifier, or the third differential amplifier.

* * * * *